March 29, 1960     J. L. REUTTER     2,930,915
SUSTAINED MOVEMENT VIBRATING PLATE ALTERNATING COMPRESSOR
Filed March 9, 1956     3 Sheets-Sheet 1

INVENTOR
JEAN L. REUTTER

March 29, 1960  J. L. REUTTER  2,930,915
SUSTAINED MOVEMENT VIBRATING PLATE ALTERNATING COMPRESSOR
Filed March 9, 1956  3 Sheets-Sheet 2

INVENTOR
JEAN L. REUTTER
BY

March 29, 1960  J. L. REUTTER  2,930,915
SUSTAINED MOVEMENT VIBRATING PLATE ALTERNATING COMPRESSOR
Filed March 9, 1956  3 Sheets-Sheet 3

INVENTOR
JEAN L. REUTTER
BY

United States Patent Office
2,930,915
Patented Mar. 29, 1960

2,930,915

SUSTAINED MOVEMENT VIBRATING PLATE ALTERNATING COMPRESSOR

Jean Leon Reutter, Vesenaz Geneva, Switzerland

Application March 9, 1956, Serial No. 570,450

Claims priority, application Switzerland March 19, 1955

4 Claims. (Cl. 310—29)

This invention relates to compressors used more particularly in the circuit of refrigerator appliances.

The essential purpose of the invention is to produce a new electromagnetically controlled compressor comprising permanent magnets which are so arranged that they do not run the risk of becoming demagnetized, as sometimes occurs, particularly when the inductive circuit is subjected to over-intensities, even momentary ones.

It has been noticed that for avoiding risks of demagnetizing permanent magnets, it is necessary that the magnetic field which passes through the magnets and/or which comes from them, can close at any moment, whatever the position of the magnets in relation to the inductive poles during their displacement, or possibly, the displacement of the latter.

According to the invention, the oscillating compressor whose movement is electro-magnetically maintained and which comprises two vibrating plates connected to compressor pistons and moving in opposition in cylinders, these vibrating plates respectively supporting a polarized armature intended to be displaced in an air-gap delimited by two identical elements of a magnetic circuit is characterized by the fact that this magentic circuit comprises eight poles so arranged that each armature is placed at rest between four poles, so that the lines of force coming from the polarization field close by the two elements of the magnetic circuit, then an alternating field coming from the coils fed directly with alternating current closes in two distinct paths respectively passing by the various poles of the magnetic circuit and the polarized armatures which are displaced so as to come into coincidence with those of the poles of the magnetic circuit which are traversed by the lines of force of the alternating field directed in the same direction as the lines of force of the constant polarization field.

Various other features of the purpose of the invention will moreover be disclosed by the detailed description which follows.

Forms of embodiment of the compressor of the invention are shown, by way of non-restrictive examples, in the attached drawings.

Figures 1, 2:
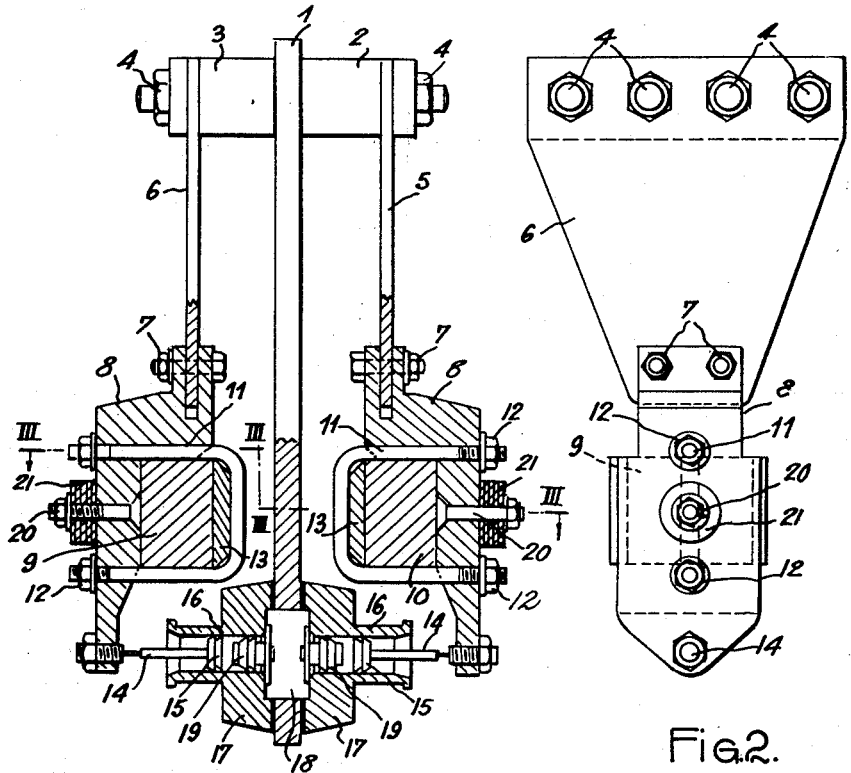
Fig. 1 is a longitudinal elevation-section, taken along the line I—I of Fig. 3, showing the principal members of the compressor according to the invention.
Fig. 2 is a lateral elevation turned by 90° corresponding to Fig. 1.

The compressor shown in the drawings comprises, as will be more particularly seen from Fig. 1, a supporting component 1 formed by a metal plate, for example, which is preferably suspended inside a fluid-tight tank or bell (not shown), into which there inputs and outputs the entry and discharge ducts of the liquid to be compressed, such as freezing fluid, as well as the electric conductors for feeding the motive part which is described farther on.

At its top part, the plate 1 carries bars 2 and 3, to whose ends there are fixed, by means of screws and nuts 4, for example, two vibrating plates or blades 5 and 6, identical with each other.

At their lower part, the plates 5, 6 which are made, for example, of spring steel, carry, fixed to them by means of screws and nuts 7, non-magnetic parts 8 which are however, preferably made of an electricity-conductive metal, so as to permit the circulation of the induced currents which can be set up when the compressor device is working, as explained farther on.

The parts 8 are shaped in such manner that they at least partially house the permanent magnets 9 and 10, to which they are connected by straps 11 of stirrup shape, whose ends are threaded to enable the retaining nuts 12 to be screwed on to them.

13 designates amagnetic metal wedges which are inserted between the magnets 9 and the cross-piece of the stirrups 11. The magnets 9 can, according to a form of embodiment not shown, be enclosed in an amagnetic metal casing, this casing being capable of connecting the magnets to the plates 5, 6.

At their lower part, the parts 8 are connected by rods 14, to pistons 15 intended to move inside cylinders 16, fixed, by their casings 17, to the plate 1 which is drilled with an opening 18 that can be put into communication with the interior of the cylinders 16 by means of valves 19, so as to act as a delivery chamber.

Furthermore, the parts 8 carry, by means of gudgeon pins 20, calibration masses 21 intended to impart to the assembly of plates 5, 6, parts 8, magnets 9, 10 and pistons 15, a suitable frequency of given vibrations.

By means of connecting members not shown, the plate 1 carries a magnetic circuit formed by two elements 22 and 23 identical with each other. These two elements are formed, for example, by magnetic sheets insulated from each other and piled so as to form two magnetic anchoring parts respectively presenting four polar parts 24, 25, 26, 27 and 24a, 25a, 26a and 27a.

The elements 22 and 23 are placed so that their polar parts 24, 25 and 24a, 25a on the one hand, and 26, 27 and 26a, 27a on the other hand, are situated at the same level as the permanent magnets 9 and 10 carried by the plates 5, 6.

The space separating the polar parts 24 to 27 from the polar parts 24a to 27a is substantially equal to the length of the magnets 9, 10, so that the air-gap which separates them is as small as possible, these magnets being arranged and having their thickness selected so that when at rest, when the flexible plates 5, 6 are vertical, they have their edges opposite respectively to the internal edges of the polar parts 24, 25, 24a, 25a and 26, 27, 26a, 27a. As shown more particularly in Fig. 3, each of the magnets 9, 10, is provided, on its faces opposite to the polar parts of the magnetic circuit, with cheeks or discs 28, 29 of magnetic metal which can, for example, be of soft iron.

Owing to the particular arrangement of the magnets and polar parts of the magnetic circuit, when the apparatus is at rest (position shown in the drawings), the magnetic field, arising out of the magnets, closes across the two elements 22, 23 of the magnetic circuit, so that these magnets do not run the risk of becoming demagnetized, which is essential for the lasting working of the apparatus.

Figure 3:
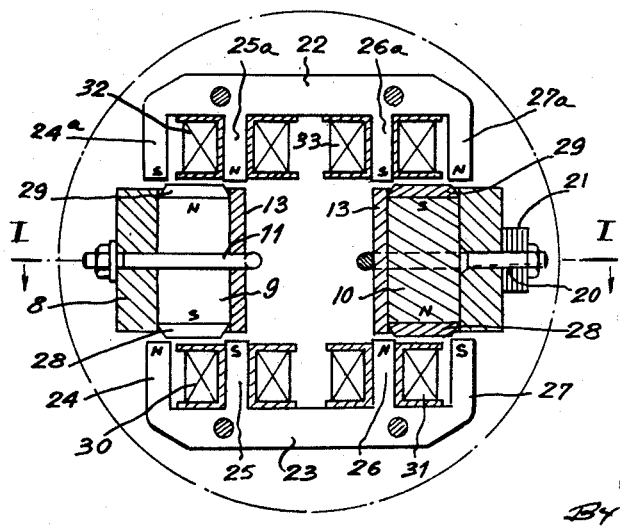
Fig. 3 is a section substantially taken along the line III—III of Fig. 1.

In the form of embodiment shown in Fig. 3, the polar parts 25, 26, 25a, 26a of the magnetic circuit carry coils 30, 31 and 32, 33 which are, for example, branched in series and connected to a fixed frequency alternating current source, for example, of 50 or 60 periods, which is the most frequent case.

Presuming that the permanent magnets 9 and 10 have the polarities that are shown in Fig. 3, these magnets being arranged so that their polarities are opposed, at a given moment $t$, the coils 30 to 33 impart, for example, to the pole 25, a south polarity, and then, to the pole 24, a north polarity; the pole 25a has a north polarity and the pole 24a a south polarity, the pole 26 has a north polarity and the pole 27 a south polarity, the pole 26a has a south polarity and the pole 27a has a north polarity.

The permanent magnets 9 and 10 then tend to deviate from each other, so that the magnetic field closes across them by the poles 24, 27, 27a and 24a. At the moment $t+\frac{1}{2}$ period, the polarity of the polar parts 24 to 27a is opposed to that shown in the drawings, but seeing that the polarity of the magnets remains the same, the latter tend to come closer to each other. Consequently, the magnetic field closes across them and the poles 25, 26, 26a and 25a.

At the moment $t+1$ period, the poles of the magnetic circuit are again those shown in the drawings, and then, the magnets again separate from each other, and so on.

Figure 4:
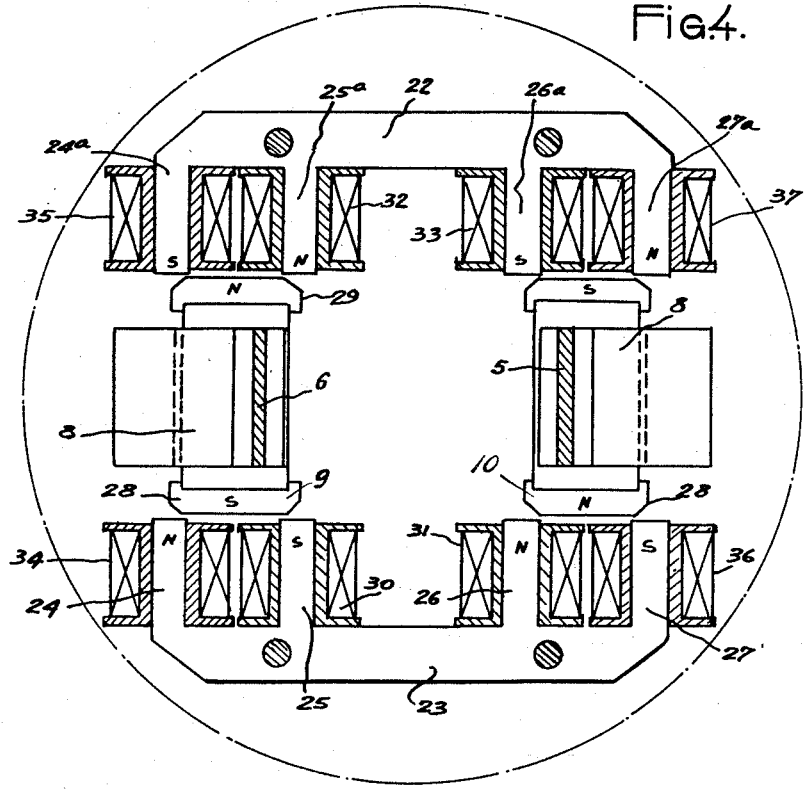
Fig. 4 is a section, on a larger scale, similar to Fig. 3, illustrating an alternative with the armatures shown in elevation.
Figure 5:
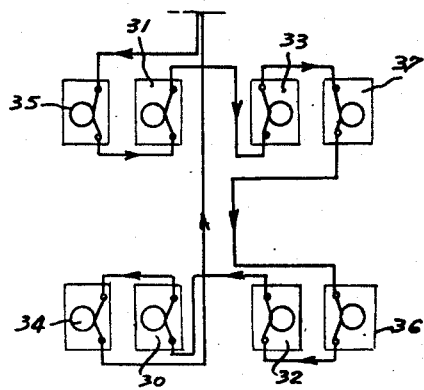
Fig. 5 is a wiring diagram showing the electrical connections between the various windings shown in Fig. 4.

According to the alternative embodiment shown in Figs. 4 and 5, the poles 24, 24a, 27, 27a are also provided with coils which are respectively designated by the numeric references 34, 35, 36 and 37. These coils, as well as the coils 30 to 33 previously described, are connected to each other, for example, as shown in Fig. 5, so that the polarity of the poles 24 to 27a, when the coils are fed with alternating current, is analogous, for example, to that shown in Fig. 4, which leads to arranging the permanent magnets 8 in the same manner as in Fig. 3, by imparting to the device a working similar to that described above.

In order to obtain a satisfactory working of the compressor described above, and this, more particularly, when it is used as a freezing fluid compressor in a refrigerator installation, it is advantageous that the natural frequency of the movable equipment formed by the plates 5, 6, the parts 8, the permanent magnets and the pistons, should be slightly lower than the frequency of the alternating current feeding the coils, so that the compressor which obviously works in synchronism with the frequency of the feed current is not, however, in resonance with that frequency, which might lead to an amplitude of the vibratory movements of the movable equipment which might be excessive and would run the risk of speedy wear, especially of the pistons. Moreover, this arrangement affords the advantage of being able to operate the compressor more and more nearly to the resonance point according as the counter-pressure of the delivered fluid increases, which particularly occurs in a refrigerator apparatus when the ambient temperature rises and that, consequently, the pressure in the condenser also rises.

Figure 6:
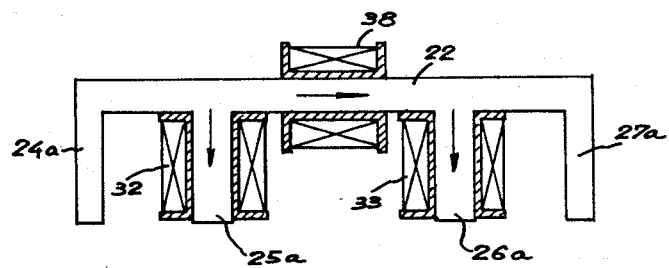
Fig. 6 is a partial diagrammatical elevation of another alternative for effecting the magnetic circuit of the compressor.

According to the alternative embodiment shown diagrammatically in Fig. 6, the magnetic circuit comprises branches 22, 23 and is formed in the same way as in Fig. 3, i.e., each branch comprises two coils 32, 33.

Furthermore, a third coil 38 is provided between the cores 25a, 26a. This coil is branched, in relation to the other coils, so that at a given moment, the lines of force are directed according to the arrows shown in Fig. 6, which shows that the flux of this latter coil always tends to increase the magnetization of the magnets, in considering that they are displaced as explained above with reference to Fig. 3.

I claim:

1. An electromagnetic motor comprising two spaced symmetrical parts each having two sets of two spaced polar pieces, the polar pieces of one symmetrical part opposing and being aligned with the polar pieces of the other symmetrical part, two armatures movable between the aligned polar pieces of the aligned sets and being of a length just short of contacting the opposing ends of the polar pieces, a permanent magnet carried by each armature and being of a thickness approximating the spacing between the polar pieces of a set and each of which alternately completes a magnetic circuit through aligned polar pieces of two opposing sets when the armatures are moving so that but for a short period of time when the armatures are moving from one pair of aligned polar pieces to the other, magnetic circuits are always completed through the magnets to retard demagnetization of the magnets, alternating current windings on at least one polar piece of each set and arranged to induce in aligned polar pieces opposite magnetic polarity, and flexible members carrying each armature to normally dispose the latter with the sides of each magnet in alignment with the polar pieces between which it moves to assure each magnet of being disposed in a magnetic circuit in the normal rest position to retard demagnetization of the magnets.

2. A motor according to claim 1 comprising an additional alternating current winding on each symmetrical part between the sets of polar pieces and arranged to increase the flux of the polar pieces.

3. A motor according to claim 1 wherein each polar piece is provided with an alternating current winding.

4. A motor according to claim 1 wherein each armature includes two discs of magnetic metal engaging the ends of each magnet.

References Cited in the file of this patent
UNITED STATES PATENTS 2,706,795    Dickey _____ Apr. 19, 1955

FOREIGN PATENTS 506,875    Belgium _____ Nov. 30, 1951
1,103,718    France _____ June 1, 1955